United States Patent
Brandenburg (10) Patent No.: US 6,389,273 B1
(45) Date of Patent: May 14, 2002

(54) ADJACENT CHANNEL INTERFERENCE REDUCTION IN A FM RECEIVER

(75) Inventor: Todd Matthew Brandenburg, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/379,231

(22) Filed: Aug. 23, 1999

(51) Int. Cl.[7] ................................................. H04B 1/10
(52) U.S. Cl. ........................ 455/296; 455/62; 455/63; 455/77; 455/450; 455/452
(58) Field of Search ........................... 455/192.1, 192.3, 455/196.1, 212, 254, 266, 283, 289, 295, 296, 313, 62, 63, 77, 450, 452, 65, 503, 67.1, 67.3, 501

(56) References Cited

U.S. PATENT DOCUMENTS

| | | | | |
|---|---|---|---|---|
| 3,934,202 A | * | 1/1976 | Missale | 333/14 |
| 4,267,605 A | * | 5/1981 | Matsuzawa et al. | 455/266 |
| 4,435,618 A | * | 3/1984 | Fujishima | 381/7 |
| 4,723,303 A | * | 2/1988 | Koch | 324/613 |
| 4,739,518 A | * | 4/1988 | Bickley et al. | 455/296 |
| 4,810,960 A | * | 3/1989 | Owen et al. | 324/76.29 |
| 4,907,293 A | * | 3/1990 | Ueno | 455/295 |
| 4,965,849 A | * | 10/1990 | Kunihiro | 455/463 |
| 5,109,529 A | * | 4/1992 | Akaiwa | 455/513 |
| 5,148,548 A | * | 9/1992 | Meche et al. | 455/296 |
| 5,303,414 A | * | 4/1994 | Brinkhaus | 455/223 |
| 5,307,515 A | * | 4/1994 | Kuo et al. | 455/295 |
| 5,369,470 A | * | 11/1994 | Hansen | 455/266 |
| 5,410,737 A | * | 4/1995 | Jones | 455/454 |
| 5,428,818 A | * | 6/1995 | Meidan et al. | 455/436 |
| 5,493,717 A | * | 2/1996 | Schwarz | 455/266 |
| 5,594,946 A | * | 1/1997 | Menich et al. | 455/522 |
| 5,630,218 A | * | 5/1997 | Muto | 455/226.2 |
| 5,649,303 A | * | 7/1997 | Hess et al. | 370/337 |
| 5,697,056 A | * | 12/1997 | Tayloe | 455/13.4 |
| 5,737,359 A | * | 4/1998 | Koivu | 370/321 |
| 5,808,463 A | * | 9/1998 | Nagano | 324/628 |
| 5,809,401 A | * | 9/1998 | Meidan et al. | 455/446 |
| 5,924,023 A | * | 7/1999 | Smith et al. | 455/226.2 |
| 6,023,625 A | * | 2/2000 | Myers, Jr. | 455/446 |
| 6,035,000 A | * | 3/2000 | Bingham | 370/525 |
| 6,047,171 A | * | 4/2000 | Khayrallah et al. | 455/266 |
| 6,181,924 B1 | * | 1/2001 | Eklund et al. | 370/483 |
| 6,195,554 B1 | * | 2/2001 | H'mimy et al. | 455/423 |
| 6,212,363 B1 | * | 4/2001 | Longshore et al. | 455/447 |
| 6,256,477 B1 | * | 7/2001 | Eidson et al. | 455/296 |
| 6,301,475 B1 | * | 10/2001 | Wallstedt et al. | 455/296 |

* cited by examiner

Primary Examiner—Dwayne Bost
Assistant Examiner—Miguel D. Green
(74) Attorney, Agent, or Firm—Jimmy L. Funke (57) ABSTRACT

A processor controlled FM receiver implements a technique for reducing adjacent channel interference without requiring additional components. Initially, the technique determines whether a desired channel has interference. If so, signal information on adjacent channels is collected. The desired channel is then shifted away from one of the adjacent channels if the collected signal information indicates that only one of the adjacent channels is appreciably interfering with the desired channel.

20 Claims, 6 Drawing Sheets

FIG. 5B

ADJACENT CHANNEL INTERFERENCE REDUCTION IN A FM RECEIVER

TECHNICAL FIELD

The present invention relates to detecting and reducing adjacent channel interference in a radio receiver, and more specifically, to determining the presence of an interfering upper adjacent channel or lower adjacent channel and shifting the frequency of a mixing signal to reduce adjacent channel interference.

BACKGROUND OF THE INVENTION

Commercial AM (amplitude modulation) and FM (frequency modulation) broadcast bands include a plurality of evenly spaced channels. Broadcast stations are allocated a channel for broadcasts within an assigned frequency range. The power spectrum of a transmission depends on the energy content of a radiated signal at each frequency. While most energy in a transmission can be limited to an assigned channel, some radiated energy will be at frequencies outside the assigned channel. This radiated energy can manifest itself as noise in an adjacent channel. The noise can include ultrasonic noise (USN) and wide band amplitude modulation (WBAM).

Assignment of broadcast channels to transmitters has been determined according to geographic location and other factors to minimize interference (noise) between transmission of adjacent channels. However, in highly populated areas there is frequently a limited number of available channels. In this situation, radio receivers must often cope with strong signals on adjacent channels which create signal components in the desired channel. These signal components interfere with the reception of the desired signal. Interference has traditionally been considered objectionable when the total power in an adjacent channel signal is about 30 dB greater than the total power in the desired channel signal.

Prior art receivers have detected the presence of objectionable adjacent channel signals by various methods. These methods have included separately tuning each channel and measuring its signal strength, detecting beat components caused by adjacent channels and detecting the difference in signal levels of a narrow band portion of the desired channel and the full band of the desired channel. In these receivers, when adjacent channels were not objectionable, a wide band intermediate frequency (IF) filter was used to maximize desired signal quality. When an adjacent channel was objectionable, a narrow band IF filter was switched into the signal path to eliminate adjacent channel interference. However, introduction of the narrow band IF filter into the signal path introduced distortion into the desired signal and affected its quality.

Another prior art approach used an adjacent channel detector with a tri-band filter that filtered the IF signal to derive a lower adjacent channel signal, a desired channel signal and an upper adjacent channel signal. The signal levels of the three channels were then compared. If only one of the adjacent channels had a signal level greater than that of the desired channel, then adjacent channel interference reduction was initiated. This was accomplished by changing the frequency of a mixing signal coupled to an IF mixer so as to move away from the interfering adjacent channel signal. This effectively moved the interfering adjacent channel signal out of the IF pass band. The addition of variable bandwidth active IF filters, switchable IF filters or tri-band filters (to adjust the bandwidth of the desired channel based on the level of interference of adjacent channels) added additional cost to the receiver. Detection circuitry associated with the tri-band filter approach further increased part count and cost of the receiver.

SUMMARY OF THE INVENTION

The present invention provides a technique for reducing adjacent channel interference in a processor controlled FM receiver. Initially, the technique determines whether the desired channel has interference. If so, signal information on adjacent channels is collected. The desired channel is then shifted away from one of the adjacent channels when the collected signal information indicates that only one of the adjacent channels is appreciably interfering with the desired channel. An advantage of the present invention is that it allows for a reduction in adjacent channel interference, in receivers that include alternate frequency (AF) switching capability, without requiring additional components.

These and other features, advantages and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

A majority of commercial FM receivers are single conversion superheterodyne receivers. These receivers are capable of tuning across the FM broadcast band (approximately 88 to 108 MHz). In these FM receivers, the intermediate frequency (IF) has traditionally been 10.7 MHz with an allocated bandwidth of 200 kHz for each station. Today, many commercial FM receivers are capable of performing alternate frequency (AF) switching under processor control.

As will be appreciated by one skilled in the art, an AF switch has traditionally been utilized when the quality of a desired signal is deficient. The channel to switch to is determined by examining radio data system (RDS) information, which is normally transmitted by each broadcasting station. For example, a broadcasting station's transmission typically includes RDS information about sister stations. A sister station is one which is simultaneously broadcasting the same information, e.g., national public radio (NPR). When the quality of the signal on the desired channel is deficient, the receiver (under processor control) switches to a sister station and obtains signal information on the sister station. If the quality of the sister station is better, the receiver switches to the sister station in a manner that is not detectable by a listener.

The present invention is particularly advantageous when used in conjunction with a receiver that is capable of monitoring signal conditions (e.g., ultrasonic noise) and switching to an adjacent channel. For practical reasons, the receiver must be capable of shifting to an adjacent channel, determining the signal strength of the adjacent channel and returning to the desired channel all in a time that is imperceptible to a listener. A processor controlled receiver implementing the present invention must typically accomplish this in about 7 mS or less. In the preferred embodiment, the present invention is implemented in a receiver system which has the ability to determine the level of an adjacent channel signal in such a time frame. Additionally, the receiver system can determine the level of a desired signal as well as noise levels (e.g., USN) of the desired signal.

High noise levels (e.g., USN) on the desired channel indicate interference. In response to undesirable noise levels, a programmed processor performs an AF switch to check signal levels of adjacent channels. When one of the adjacent channels is at a level (with respect to the desired channel) that indicates interference with the desired channel, the receiver is tuned away from the interfering channel. If the noise level on the desired channel improves, the receiver is left in its current state. If the noise level did not improve, the receiver is returned to its original setting.

Figure 1:
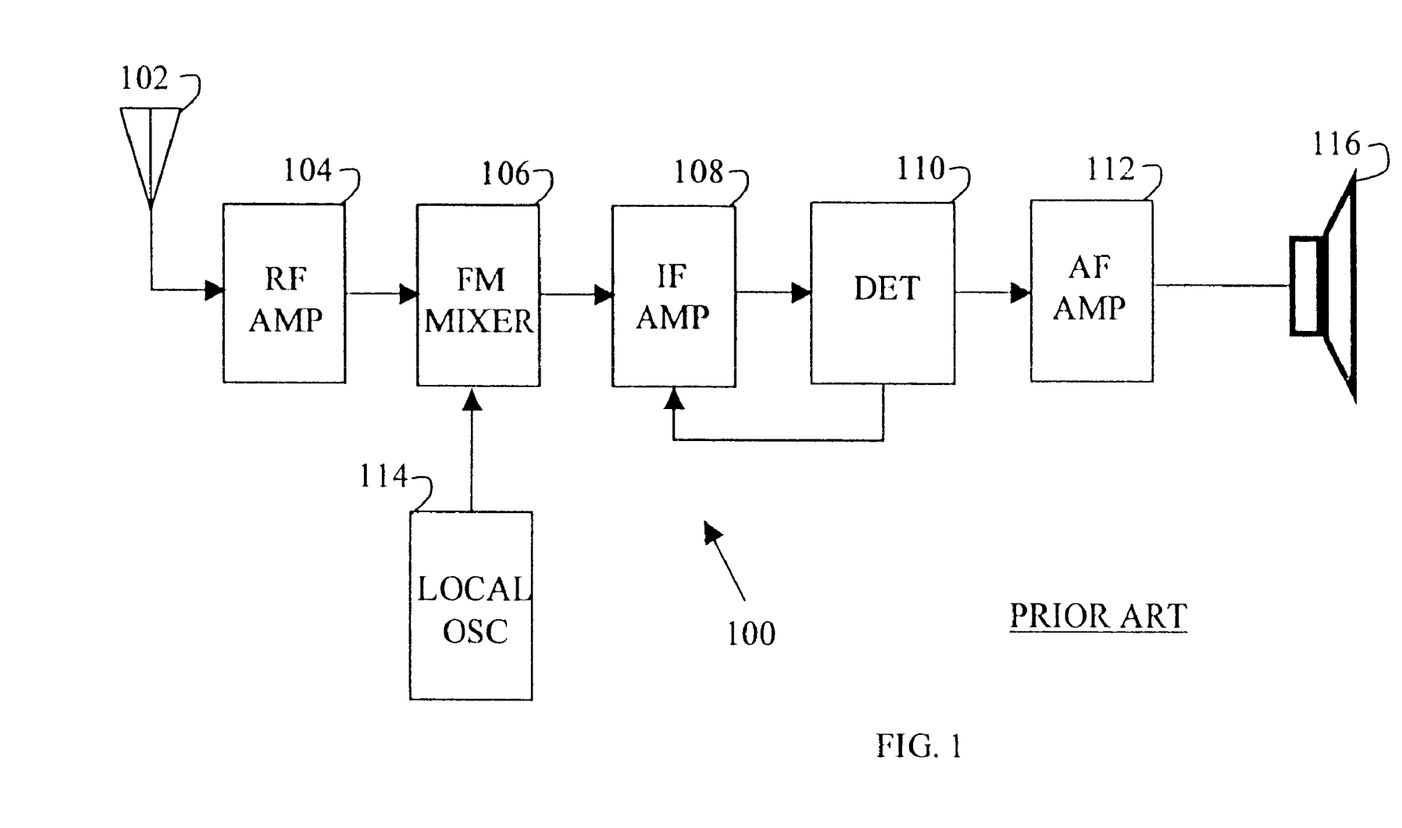
FIG. 1 is a block diagram of a typical prior art superheterodyne receiver.

FIG. 1 shows a simplified block diagram of a single conversion superheterodyne receiver 100 according to the prior art. Antenna 102 receives radio frequency (RF) signals and supplies those signals to a RF amplifier 104. RF amplifier 104 provides pre-amplification for the received signal and couples those signals to an FM mixer 106. FM mixer 106 receives a local oscillator signal from a local oscillator 114. By varying the frequency of the local oscillator signal, the receiver can be tuned across the FM broadcast band. The FM mixer 106 beats the received signal with the local oscillator signal and provides the mixed signal to IF amplifier 108. IF amplifier 108, which includes an IF filter at its input, amplifies the mixed signal and provides an amplified mixed signal to the detector 110.

Detector 110 may include an automatic gain control (AGC) circuit which is coupled to IF amplifier 108 and provides a gain signal to control the gain of IF amplifier 108. Detector 110 detects the audio signal and provides the audio signal to an audio frequency (AF) amplifier 112. The audio frequency amplifier amplifies the audio signal and provides an amplified audio signal to a speaker 116.

Figure 2:
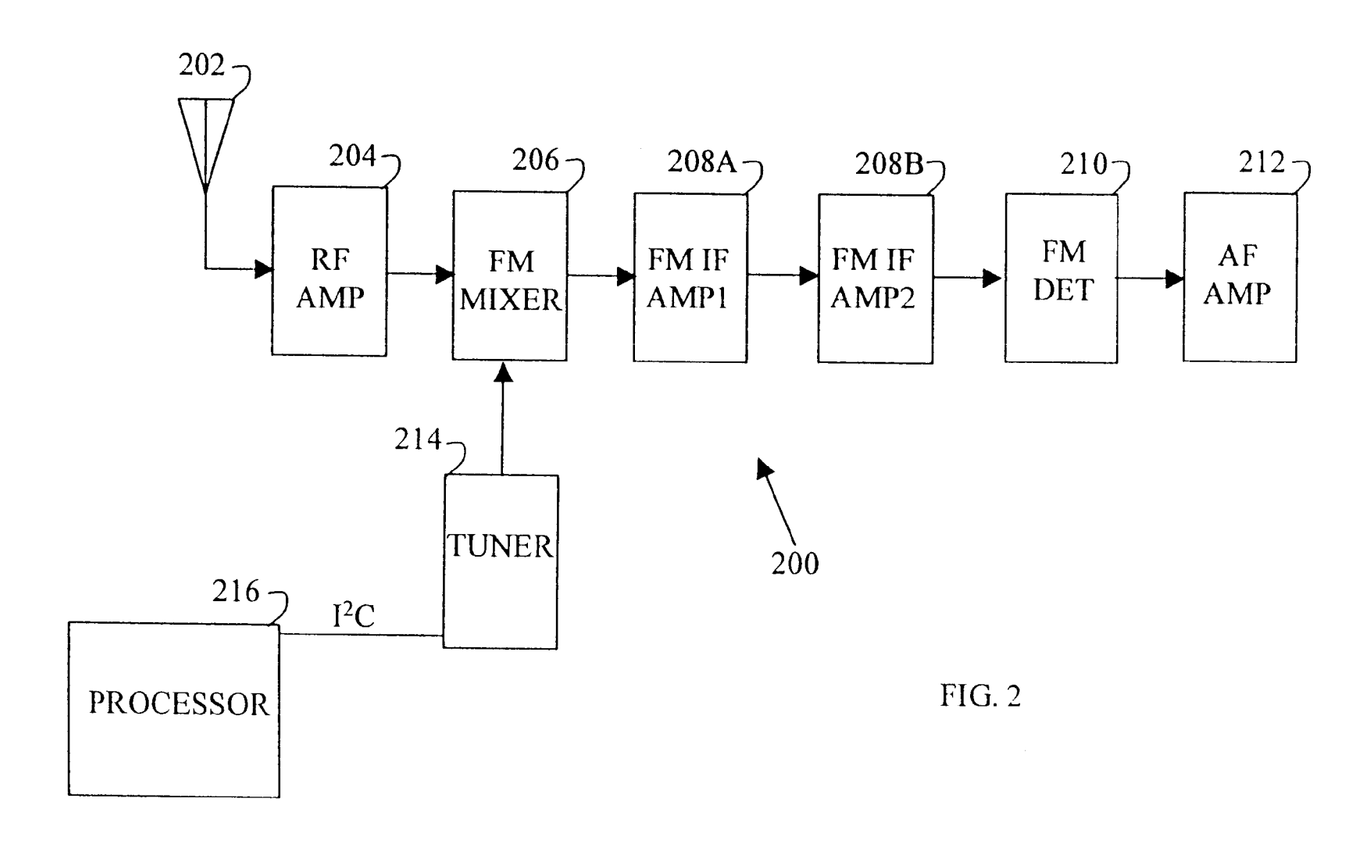
FIG. 2 is a block diagram of a single conversion superheterodyne receiver according to an embodiment of the present invention.

FIG. 2 depicts a single conversion superheterodyne receiver 200 according to an embodiment of the present invention. While only a single conversion receiver is discussed herein, the techniques according to the present invention are equally applicable to other receivers, e.g., double conversion, triple conversion, etc. Antenna 202 couples a received signal to an RF amplifier 204. RF amplifier 204 amplifies the received signal and provides the signal to a FM mixer 206. FM mixer 206 beats the received signal with an oscillator signal provided by tuner 214 and provides a mixed signal.

The frequency of the oscillator signal is adjusted responsive to an $I^2C$ signal provided by a processor 216. In this context, the term processor may include a general purpose processor, a microcontroller (i.e., an execution unit with memory, etc., integrated within a single integrated circuit) or a digital signal processor. As above, varying the frequency of the oscillator signal allows the receiver to be tuned across the FM broadcast band. FM mixer 206 then provides the mixed signal to a first FM IF amplifier 208A which amplifies the mixed signal. FM IF amplifier 208A includes an IF filter at its input. FM IF amplifier 208A is coupled to a second IF amplifier 208B. FM IF amplifier 208B also includes an IF filter at its input. FM IF amplifier 208B amplifies the mixed signal and provides the mixed signal to a FM detector 210. Alternatively, both FM IF amplifiers 208A and 208B could be contained within a single functional unit. FM detector 210 receives the amplified mixed signal and detects the audio signal. The audio signal is provided to an audio frequency (AF) amplifier 212. The audio frequency amplifier 212 amplifies the audio signal and provides it to a speaker (not shown).

Figure 3:
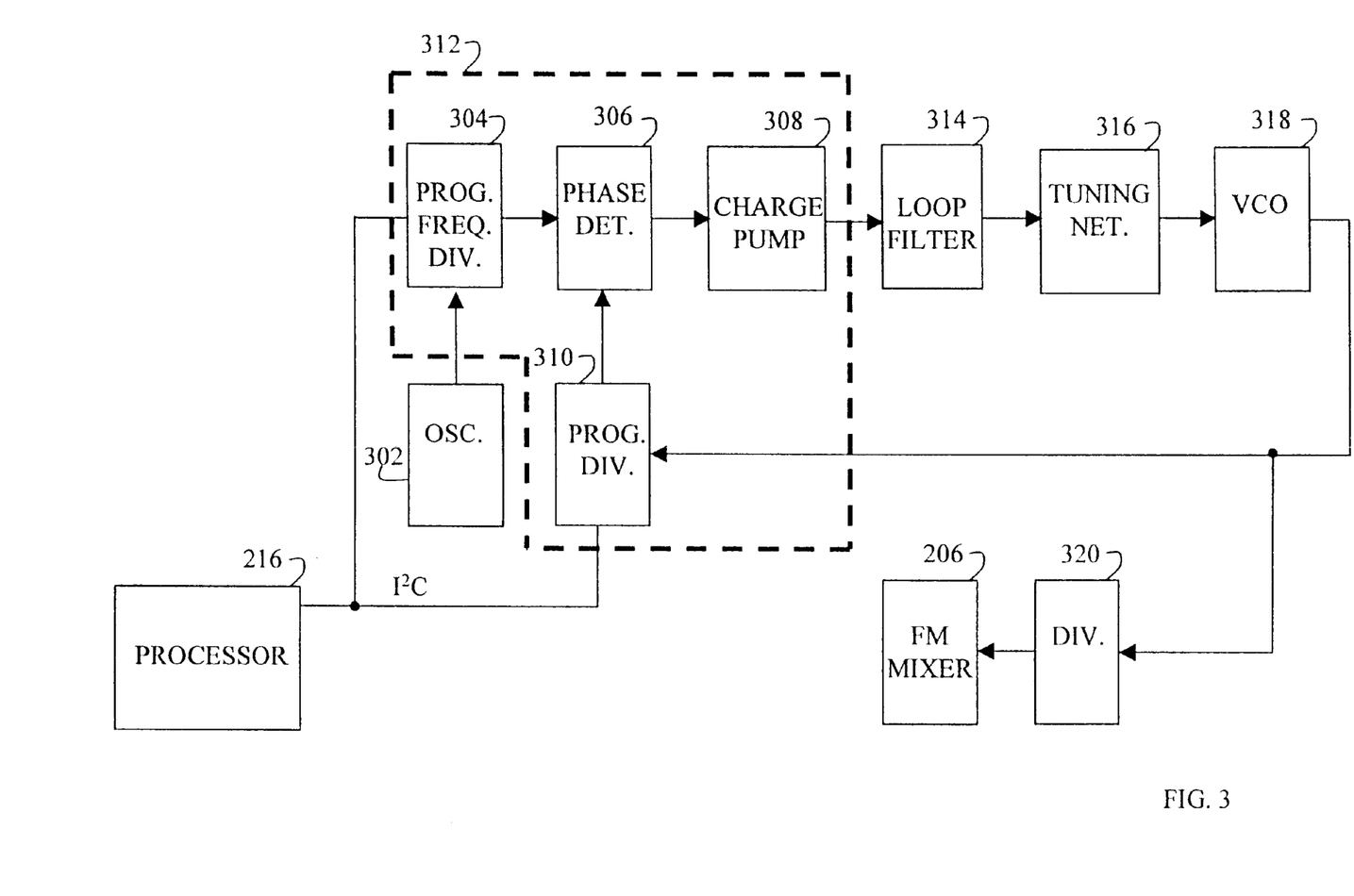
FIG. 3 is a block diagram that illustrates the tuner of FIG. 2, according to an embodiment of the present invention, in greater detail.

FIG. 3 further illustrates tuner 214 of FIG. 2. Tuner system 312 includes programmable frequency divider 304, phase detector 306, charge pump 308 and programmable divider 310. Programmable frequency divider 310 receives input from oscillator 318. Programmable frequency divider 304 and programmable divider 310 are programmed by a processor 216 across an $I^2C$ bus. A beat signal that is ultimately coupled to FM mixer 206 is dependent upon the value programmed into programmable registers (not shown in FIG. 3) of programmable divider 310 and programmable frequency divider 304. Programmable frequency divider 304 receives an oscillator signal from crystal oscillator 302.

The oscillator signal is divided, as appropriate, and is applied to the phase detector 306. Phase detector 306 also receives an input signal from programmable divider 310. Phase detector 306 provides an output signal to charge pump 308. Charge pump 308 is coupled to a loop filter 314. Loop filter 314 is coupled to a tuning network 316. Loop filter 314 helps to establish the proper transient response and filtering for transient and steady-state operation. Tuning network 316 is coupled to a voltage controlled oscillator (VCO) 318. VCO 318 produces an output signal whose frequency deviation about a center frequency is proportional to its input voltage. VCO 318 is coupled to programmable divider 310.

Programmable divider 310 divides the output of the VCO 318 and provides it to phase detector 306. The output of VCO 318 is also provided to a divider 320. The output (mixing signal) of divider 320 is coupled to FM mixer 206. As will be appreciated by one skilled in the art, utilizing tuning system 312, the receiver can be tuned across the FM broadcast band at the direction of processor 216. This programmable feature of many commercial receivers can be advantageously used to minimize the impact of adjacent channel interference.

Figure 4:
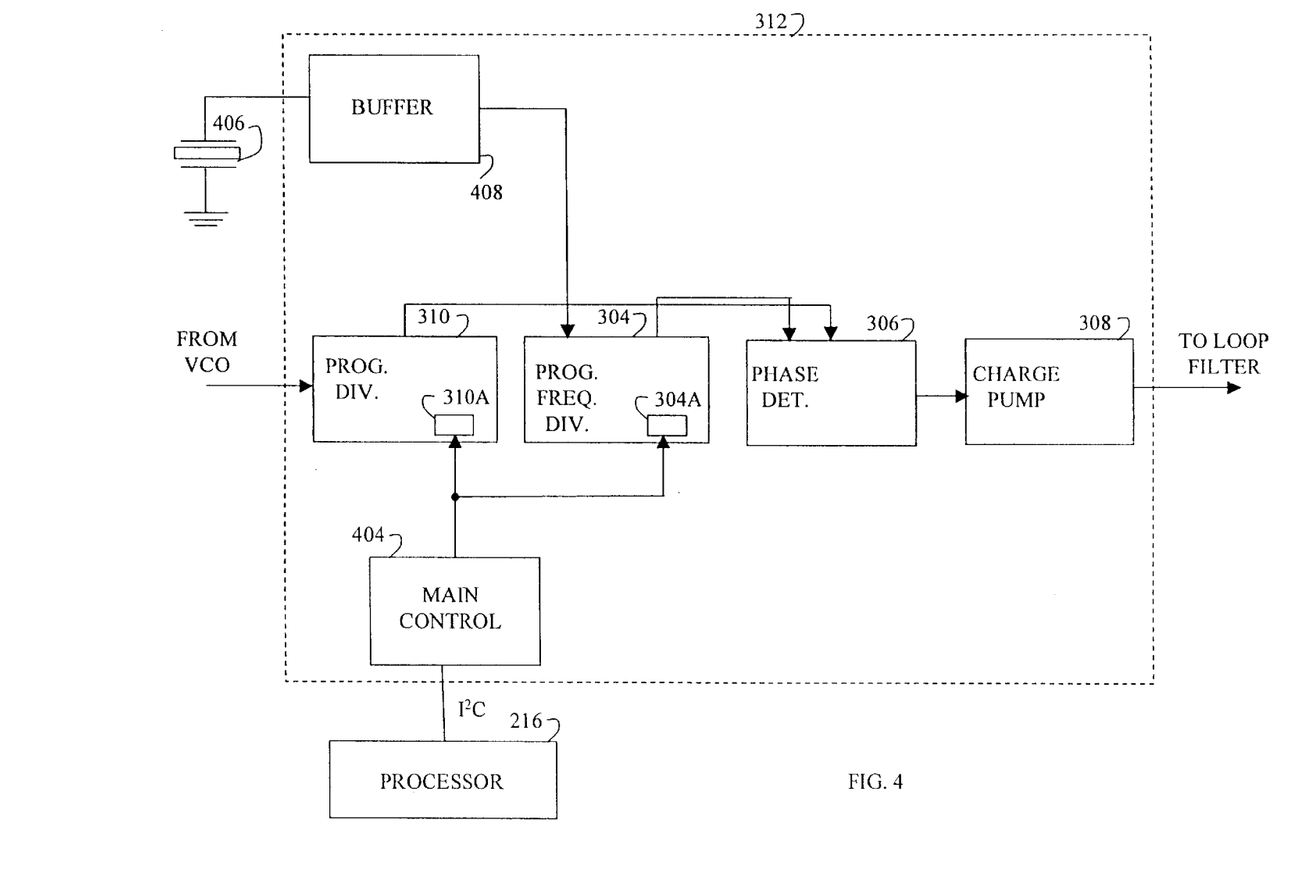
FIG. 4 is a block diagram illustrating the tuner of FIG. 3, according to an embodiment of the present invention, in more detail.

FIG. 4 illustrates tuning system 312 in more detail. Processor 216 addresses and controls tuning system 312 utilizing an $I^2C$ bus. Processor 216 is coupled to a main control block 404. Main control block 404 receives commands from processor 216 and sets appropriate registers (304A and 310A) of program frequency divider 304 and program divider 310 as directed. Programmable divider 310 can be implemented as a pulse swallow type counter. Utilizing a programmable frequency divider 304 allows for the use of a number of different crystals. Buffer 408 buffers the output of crystal 406 into programmable frequency divider 304. Alternatively, programmable frequency divider 304 could include a buffer and be directly coupled to crystal 406. The output of VCO 318 is coupled to the input of programmable divider 310.

Phase detector 306 generally includes both a phase and a frequency detector. As previously disclosed, phase detector 306 receives inputs from both programmable frequency divider 304 and programmable divider 310, and in response to the inputs provides an output to charge pump 308. In a typical application, the output of charge pump 308 is provided to a loop filter 314 as previously discussed in conjunction with FIG. 3.

Figure 5A:
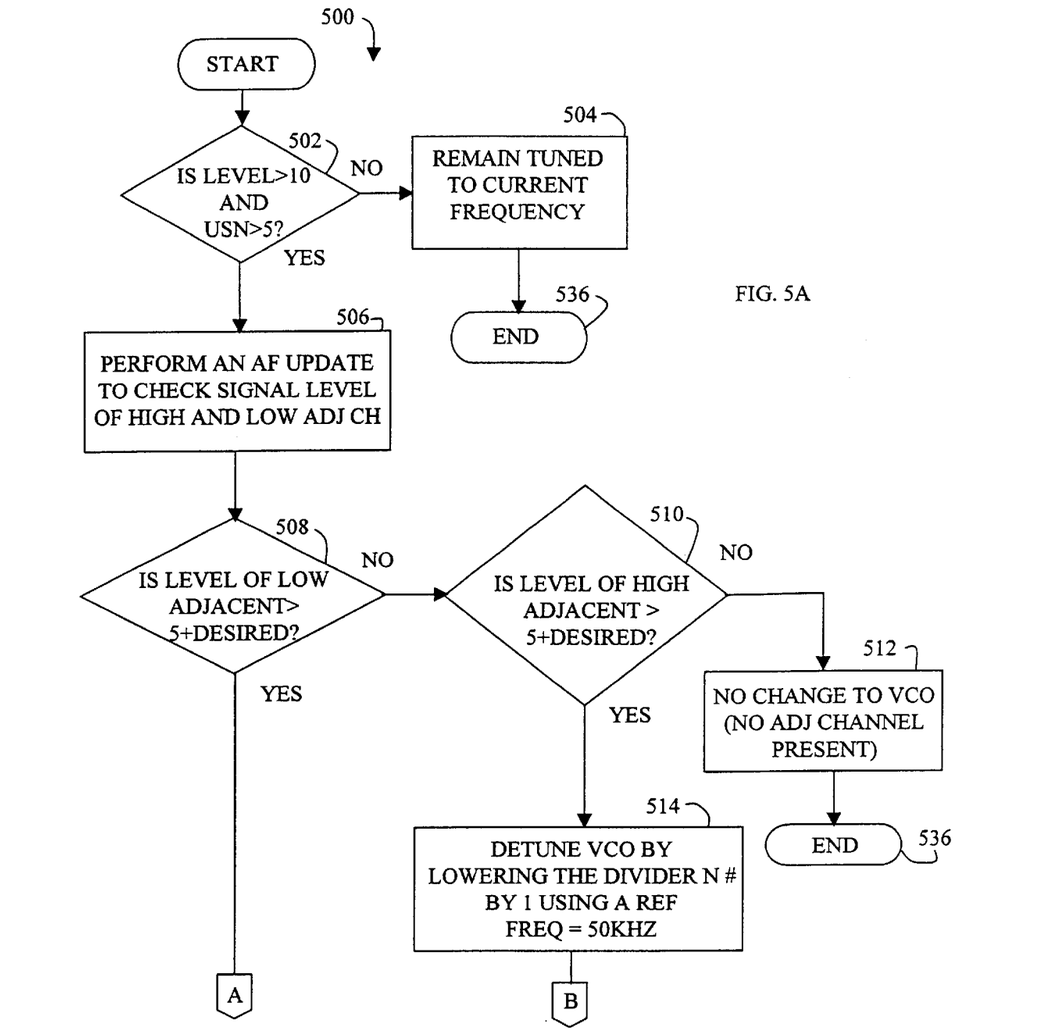
FIGS. 5A–B are flowcharts illustrating a technique for reducing adjacent channel interference, according to an embodiment of the present invention.
Figure 5B:
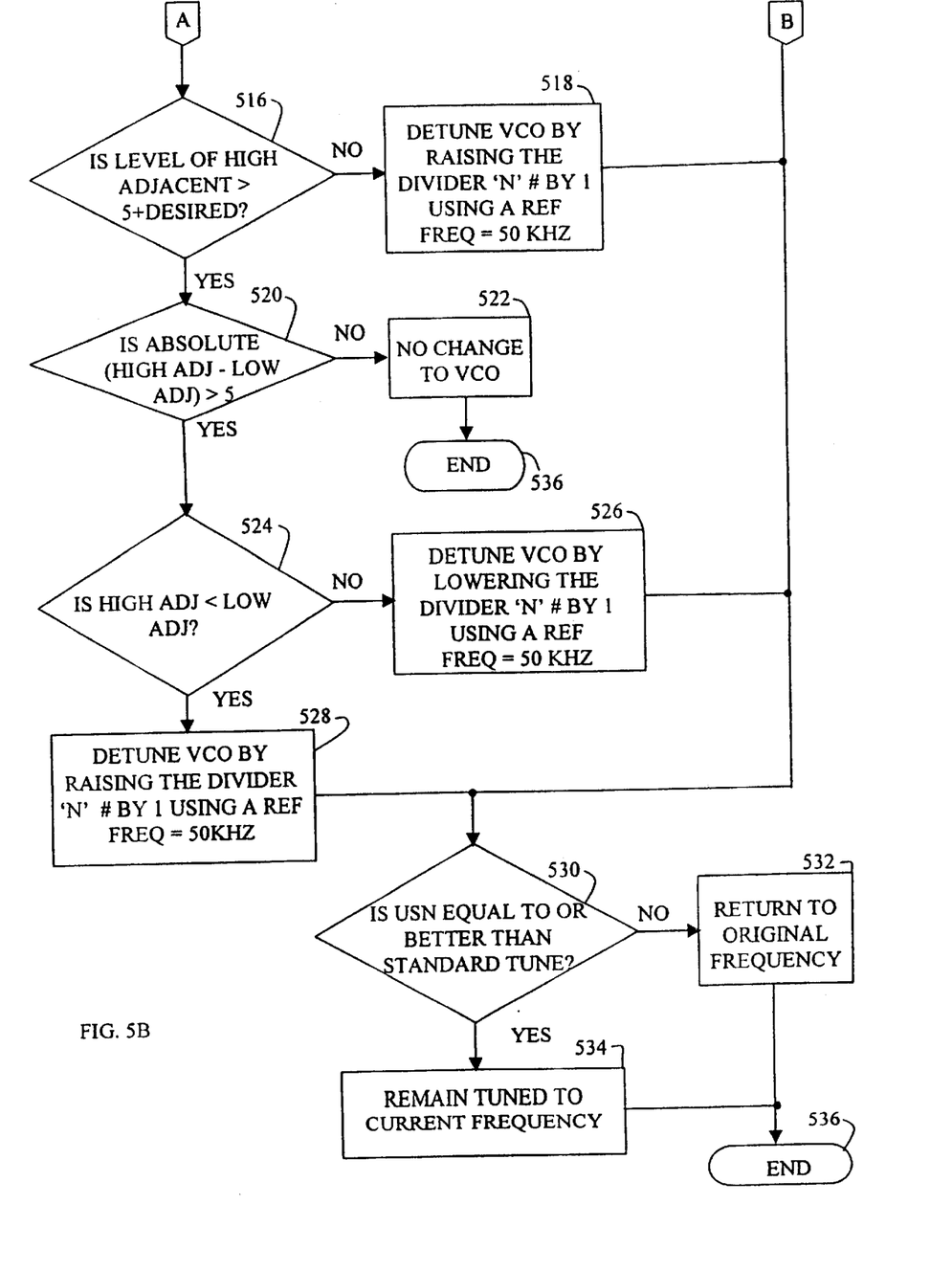

FIGS. 5A–B illustrate an adjacent channel interference reduction routine 500, according to an embodiment of the invention. Upon entering routine 500, control transfers to step 502. In step 502, if a desired signal level is greater than a value of ten and a USN level of the desired signal is greater than a value of five, control transfers to step 506. In this context, a desired signal level of ten refers to the value of a digital word. The value of the digital word is determined by reading the voltage level of the desired signal with an A/D converter (internal to processor 216). Alternatively, the A/D converter can be external to processor 216. The voltage reading is then converted to a digital word with a value from zero to sixty-three. In the preferred embodiment, the internal A/D converter is a 6-bit A/D converter with a resolution of 47 mV.

Similarly, a USN level of five refers to the value of a digital word. In the preferred embodiment, a detected audio signal, of the desired channel, is coupled through a 70 kHz high pass filter. The USN level, of the desired channel, is then determined by taking a voltage reading of the filtered audio signal using a 3-bit A/D converter. The voltage reading is then converted to a digital word with a value from zero to seven. In the preferred embodiment, the resolution the 3-bit A/D converter is 340 mV. As utilized herein, a particular level refers to the value of a digital word.

In step 502, if the level of the desired signal is not greater than ten or the USN level is not greater than five, control transfers to step 504. In step 504, routine 500 causes the receive to remain tuned to the current frequency. From step 504, control passes to step 536 where the routine 500 returns to the calling program.

In step 506, routine 500 performs an alternate frequency (AF) switch to check the signal levels of the upper and lower adjacent channels. If the level of the lower adjacent channel is greater than the desired channel level plus five, control transfers to step 516. If the level of the lower adjacent channel is less than the desired channel level plus five, control transfers to step 510. In step 510, if the level of the upper adjacent channel signal is greater than the desired channel level plus five, control transfers to step 514. If the level of higher adjacent channel signal is less than five plus the desired channel level, control transfers to step 512. In step 512, routine 500 then directs that the VCO not change frequency (because there is no adjacent channel that is presently interfering). From step 512, control then transfers to step 536 where routine 500 is exited.

In step 514, since the upper adjacent channel signal is interfering with the desired channel signal the VCO is detuned. This is accomplished by programming programmable divider 310 to a lower frequency (changing the divide by N#). This, in essence, detunes the VCO away from the interfering channel. In the preferred embodiment, the VCO is detuned in about 50 kHz increments (station is tuned by about 25 kHz). From step 514, control then transfers to step 530.

In step 530, routine 500 next determines whether the USN level is equal to or better than the standard tuning level. If the USN is less than it previously was, control transfers to step 534. In step 534, routine 500 then directs the VCO to remain tuned to the current frequency. From step 534, routine 500 then proceeds to step 536. When the USN noise level has increased, in step 530, control transfers from step 530 to step 532. In step 532, routine 500 causes the receiver to return to its original frequency. From step 532, control passes to step 536 where routine 500 is exited.

From step 508, when the level of the lower adjacent channel is greater than the level of the desired channel plus five, control transfers to step 516. In step 516, routine 500 determines whether the level of the upper adjacent channel is greater than five plus the level of the desired channel. If so, control transfers to step 520. If not, control transfers from step 516 to step 518. In step 518, routine 500 causes the VCO to be detuned toward the upper adjacent channel. From step 518, control transfers to step 530. As previously discussed, in conjunction with step 530, routine 500 determines whether the USN level is equal to or better than it previously had been.

If detuning the VCO toward the upper adjacent channel has decreased the USN level, control passes from step 530 to step 534. Otherwise, control transfers from step 530 to step 532. Step 534 directs the VCO to remain at the current frequency. Step 532 causes the VCO to return to its original frequency. From step 532 or step 534, control transfers to step 536 and routine 500 is exited.

In step 516, if the level of the upper adjacent channel is greater than the desired channel level plus five, control transfers to step 520. In step 520, routine 500 then compares signal magnitudes of the upper adjacent and lower adjacent channels. If the signal level of the channels does not vary by more than a value of five, then control transfers from step 520 to step 522. In step 522, routine 500 directs the VCO to remain in its current state. From step 522, control transfers to step 536 where routine 500 is exited. From step 520, if the upper and lower adjacent channel signal levels differ in signal strength by more than five, control transfers to step 524.

In step 524, routine 500 determines whether the upper adjacent channel signal strength is less than the lower adjacent channel signal strength. If the upper adjacent channel signal strength is less than the lower adjacent channel signal strength, control transfers to step 528. If the upper adjacent channel signal strength is greater than or equal to the lower adjacent channel strength, control transfers to step 526. In step 526, the VCO is detuned toward the lower adjacent channel. From step 526, control then transfers to step 530. In step 528, routine 500 directs that the VCO be adjusted toward the upper adjacent channel. From step 528, control then transfers to step 530.

Utilizing the above-described technique, a receiver can typically improve the signal-to-noise and distortion (SINAD) level on the desired channel. The above-described receiver is especially advantageous in mobile applications, e.g., a receiver in an automobile. In the automotive environment, a receiver may frequently change geographic listening areas. In this situation, having a processor controlled receiver that can optimize listening conditions is desireable.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A method for reducing adjacent channel interference in a processor controlled FM receiver, comprising the steps of:
   (a) collecting signal information on a desired channel and determining if the desired channel has undesirable interference;
   (b) switching from the desired channel to an adjacent channel when the desired channel has undesirable interference, otherwise remaining tuned to the desired channel;
   (c) determining a signal level of the adjacent channel; and
   (d) shifting the desired channel away from the adjacent channel if the signal level of the adjacent channel indicates the adjacent channel is interfering with the desired channel.

2. The method of claim 1, wherein the adjacent channel is a lower adjacent channel.

3. The method of claim 1, wherein the adjacent channel is an upper adjacent channel.

4. The method of claim 1, wherein the adjacent channel includes both an upper and a lower adjacent channel.

5. The method of claim 1, wherein the desired channel is only shifted away from the adjacent channel if another adjacent channel causes less interference with the desired channel.

6. The method of claim 1, wherein the collected signal information includes a signal level and an ultrasonic noise (USN) level.

7. The method of claim 1, wherein the collected signal information includes an ultrasonic noise (USN) level.

8. The method of claim 1, further comprising the steps of:
   (e) collecting additional signal information on the desired channel to determine if the undesirable interference is less after the shift; and
   (f) shifting the desired channel back to its original position if the undesirable interference is not less after the shift.

9. The method of claim 1, further comprising the step of:
   (g) switching back to the desired channel in about 7 ms or less, wherein the signal information is collected such that a user of the system cannot audibly discern that the switch occurred.

10. The method of claim 1, wherein the desired channel is shifted away from the interfering adjacent channel by about 25 kHz.

11. A tuning system for reducing adjacent channel interference in an FM receiver, comprising:
    a tuner;
    a processor coupled to the tuner;
    a memory coupled to the processor, the memory storing data and instructions; and
    tuning code located in the memory for causing the processor to perform the steps of:
       (a) collecting signal information on a desired channel and determining whether the desired channel has undesirable interference;
       (b) switching the tuner from the desired channel to an adjacent channel when the desired channel has undesirable interference, otherwise remaining tuned to the desired channel;
       (c) determining a signal level of the adjacent channel; and
       (d) shifting the desired channel away from the adjacent channel if the signal level of the adjacent channel indicates the adjacent channel is interfering with the desired channel.

12. The tuning system of claim 11, wherein the adjacent channel is a lower adjacent channel.

13. The tuning system of claim 11, wherein the adjacent channel is an upper adjacent channel.

14. The tuning system of claim 11, wherein the adjacent channel includes both an upper and a lower adjacent channel.

15. The tuning system of claim 11, wherein the desired channel is only shifted away from the adjacent channel if another adjacent channel causes less interference with the desired channel.

16. The tuning system of claim 11, wherein the collected signal information includes a signal level and an ultrasonic noise (USN) level.

17. The tuning system of claim 11, wherein the collected signal information includes an ultrasonic noise (USN) level.

18. The tuning system of claim 11, wherein the tuning code causes the processor to perform the additional steps of:
    (e) collecting additional signal information on the desired channel to determine if the interference level is less after the shift; and
    (f) shifting the desired channel back to its original position if the interference level is not less after the shift.

19. The tuning system of claim 11, further comprising the step of:
    (g) switching back to the desired channel in about 7 ms or less, wherein the signal information is collected such that a user of the system cannot audibly discern that the switch occurred.

20. The tuning system of claim 11, wherein the desired channel is shifted away from the adjacent channel by about 25 kHz.

* * * * *